US008077792B2

(12) United States Patent
Lee et al.

(10) Patent No.: US 8,077,792 B2
(45) Date of Patent: Dec. 13, 2011

(54) METHOD AND APPARATUS FOR ALLOCATING TRANSMISSION POWER IN COMMUNICATION SYSTEM WITH MULTIPLE ANTENNAS

(75) Inventors: Yu-Ro Lee, Daejeon (KR); In-Kyeong Choi, Daejeon (KR); Dong-Seung Kwon, Daejeon (KR)

(73) Assignees: Samsung Electronics Co., Ltd (KR); Electronics and Telecommunications Research Institute (KR); KT Corporation (KR); SK Telecom Co., Ltd (KR); Hanaro Telecom, Inc. (KR)

( * ) Notice: Subject to any disclaimer, the term of this patent is extended or adjusted under 35 U.S.C. 154(b) by 1201 days.

(21) Appl. No.: 11/636,780

(22) Filed: Dec. 11, 2006

(65) Prior Publication Data
US 2007/0133708 A1 Jun. 14, 2007

(30) Foreign Application Priority Data
Dec. 9, 2005 (KR) .................. 10-2005-0120821

(51) Int. Cl.
H04B 7/02 (2006.01)
H04L 1/02 (2006.01)
(52) U.S. Cl. .......................................... 375/267
(58) Field of Classification Search .................. 375/260, 375/267, 295, 326, 347, 299, 316, 341; 370/204, 370/208, 342, 347; 455/136, 137, 522, 69, 455/115.1, 561
See application file for complete search history.

(56) References Cited

U.S. PATENT DOCUMENTS

| 2003/0112880 A1* | 6/2003 | Walton et al. ................. 375/260 |
| 2004/0192239 A1* | 9/2004 | Nakao et al. .................. 455/136 |
| 2005/0053170 A1* | 3/2005 | Catreux et al. ............... 375/267 |
| 2005/0141631 A1* | 6/2005 | Takano ......................... 375/267 |
| 2005/0141647 A1* | 6/2005 | Nakao et al. .................. 375/326 |
| 2005/0249304 A1* | 11/2005 | Takano et al. ................ 375/267 |
| 2006/0105724 A1* | 5/2006 | Nakao ........................ 455/115.1 |
| 2007/0054623 A1* | 3/2007 | Sato ............................ 455/67.11 |

FOREIGN PATENT DOCUMENTS
KR 1020050076675 A 7/2005

OTHER PUBLICATIONS

M. Gidlund, Precoded Closed-Loop MIMO-OFDM System Using Predefined Set of Rotation Matrices, Electronic Letters, Mar. 3, 2005, vol. 41, No. 5.

* cited by examiner

*Primary Examiner* — David C. Payne
*Assistant Examiner* — Syed Haider
(74) *Attorney, Agent, or Firm* — The Farrell Law Firm, P.C.

(57) ABSTRACT

In a method for allocating transmission power in a communication system including multiple antennas, a plurality of subcarriers are grouped by a plurality of groups, and each group includes at least one subcarrier. A transmission power weight and an antenna transmission vector are calculated for each group by using channel information, a transmission power for each group of each antenna is calculated by using the transmission power weight and the antenna transmission vector for each group, and transmission signals are transmitted through the multiple antennas after determining which signals need to be transmitted from the multiple antennas by using the transmission power.

22 Claims, 7 Drawing Sheets

FIG. 2(Proir Art)

FIG. 3(Prior Art)

| Vector index | 1 | 2 | 3 | 4 | 5 | 6 | 7 | 8 |
|---|---|---|---|---|---|---|---|---|
| v1 | 1 | 0.3780 | 0.3780 | 0.3780 | 0.3780 | 0.3780 | 0.3780 | 0.3780 |
| v2 | 0 | -0.2698 - j0.5668 | -0.7103 + j0.1326 | 0.2830 - j0.0940 | -0.0841 + j0.6478 | 0.5247 + j0.3532 | 0.2058 - j0.1369 | 0.0618 - j0.3332 |
| v3 | 0 | 0.5957 + j0.1578 | -0.2350 - j0.1467 | 0.0702 - j0.8261 | 0.0184 + j0.0490 | 0.4115 + j0.1825 | -0.5211 + j0.0833 | -0.3456 + j0.5029 |
| v4 | 0 | 0.1587 - j0.2411 | 0.1371 + j0.4893 | -0.2801 + j0.0491 | -0.3272 - j0.5662 | 0.2639 + j0.4299 | 0.6136 - j0.3755 | -0.5704 + j0.2113 |

FIG. 4(Proir Art)

METHOD AND APPARATUS FOR ALLOCATING TRANSMISSION POWER IN COMMUNICATION SYSTEM WITH MULTIPLE ANTENNAS

PRIORITY

This application claims priority to Korean Patent Application No. 10-2005-0120821 filed in the Korean Intellectual Property Office on Dec. 9, 2005, the entire contents of which are incorporated herein by reference.

BACKGROUND OF THE INVENTION

1. Field of the Invention

The present invention relates generally to a method and apparatus for allocating transmission power in a communication system with multiple antennas, and more particularly to a method for allocating transmission power in a communication system with an Orthogonal Frequency Division Multiplexing (OFDM) scheme.

2. Description of the Related Art

An OFDM system is applied in the Fourth Generation (4G) mobile communication system requiring large capacity of data transmission, such as Wireless Local Area Network (WLAN), wireless broadcasting and Digital Multimedia Broadcasting (DMB), in order to transmit wideband high-speed data. An OFDM system transmits operational bandwidth by dividing the operational bandwidth into several subcarriers. Specifically, an OFDM system converts inputted serial data into parallel data, and transmits the parallel data allocated to each subcarrier such that data ratio can be increased.

FIG. 1 is a diagram illustrating a conventional data transmission/receiving system employing an OFDM system.

Referring to FIG. 1, an OFDM transmission system includes an encoder 102, a Serial to Parallel converter (S/P) 104, preamble or pilot generator 106, multiplexer 108, an Inverse Fast Fourier Transformer (IFFT) 110, a Parallel to Serial converter (P/S) 112, and a Digital to Analog (D/A) converter and filter 114. An OFDM receiving system includes an Analog to Digital (A/D) converter and filter 116, an S/P 118, a Fast Fourier Transformer (FFT) 120, demultiplexer 122, preamble or pilot extractor 124, a P/S 126 and decoder 128.

The encoder 102 modulates transmission data to a modulation scheme, such as Binary Phase Shift Key (BPSK), Quadrature Phase Shift Key (QPSK), 16 Quadrature Amplitude Modulation (QAM) and 64 QAM.

The S/P 104 converts high-speed serial data to low-speed parallel data, and the preamble or pilot generator 106 creates a pilot or preamble that is loaded into transmission data. The multiplexer 108 multiplexes transmission data received from the S/P 104, and a pilot or preamble created from the preamble or pilot generator 106.

The IFFT 110 converts multiplexing signals into signals of a timing axis by using a Fourier transform, and the P/S 112 converts parallel signals into serial signals, and a Cyclic Prefix (CP) is added to a front terminal of the P/S 112.

A digital transmission signal that is converted into a serial signal by the P/S 112 can be converted to an analog signal by the D/A converter and filter 114, and the analog signal is transmitted through an antenna of a Radio Frequency (RF) terminal after passing the filter.

The transmitted analog signal is received by an antenna of the receiving system, and is converted into the digital signal by the A/D converter after passing the filter of the A/D converter and filter 116. The S/P 118 converts the serial signal into the parallel signal after eliminating a CP, and transmits the parallel signal to the FFT 120. The FFT 120 Fourier transforms the transmitted parallel signal, and then transmits the signal to the demultiplexer 122. The demultiplexer 122 demultiplexes data, and then separates data from a preamble or pilot signal through the preamble or pilot extractor 124. The parallel data signal is converted into the serial signal through the P/S 126 after the data is separated from the signal. The decoder 128 data demodulates by using a channel that is estimated by the preamble or pilot extracted from the preamble or pilot extractor 124.

When a transmission terminal of a data transmission/receiving system with an OFDM system knows channel information and uses a multiple antenna, the transmission/receiving system with the OFDM system can apply a Multi-Input Multi-Out (MIMO) precoding scheme that improves transmission efficiency by using the channel information known to the transmission terminal.

FIG. 2 is a diagram illustrating a conventional transmission block of a multiple antenna applying the MIMO preceding scheme.

An OFDM transmitter applying the MIMO preceding includes a transmission signal determination module 230 between a multiplexer 108 and a plurality of IFFTs 242, 244 and 246, a channel information module 210 connected to the transmission signal determination module 230, and an antenna transmission vector determination module 220.

The channel information module 210 uses channel reversibility as the channel information, and stores the feedback information, such as a code book index, and provides the antenna transmission vector determination module with the stored information. At this time, the channel information may be received by a group unit. The group includes "I" subcarriers that are physically consecutive, wherein "I" denotes a number between one and total number of the entire subcarriers.

The antenna transmission vector determination module 220 calculates transmission weight for each antenna in each group from the received channel information or the code book index. When the antenna transmission vector determination module 220 receives the radio channel information, it calculates the optimal transmission weight from the radio channel information. When instantaneous channel information is used for calculating the optimal transmission weight by using the radio channel information, transmission weight vector for each antenna is expressed as set forth in Equation (1):

$$w_0 = \arg\max_{\|w\|^2 \le 1} w^H R w. \quad (1)$$

Here, "R" is obtained by the Equation (2), $$R = H^H H \quad (2)$$

wherein "R" denotes a covariance matrix for M×M instantaneous channel. When eigenvalue decomposition is performed from Equation (1) calculating the transmission weight vector for each antenna, transmission weight vector that maximizes receiving Signal-to-Noise Ratio (SNR) can be obtained.

When the code book is used for calculating the optimal transmission weight, a transmitter and a receiver have a predetermined code book, and the receiver obtains the optimal transmission vector and transmits the index for the vector by feedback. Consequently, an amount of the feedback information can be reduced. In addition, the transmitter determines the transmission weight for each antenna from the feedback index.

FIG. 3 is a table illustrating a conventional transmission signal for each antenna according to a code book index.

FIG. 3 is an example involving four transmission antennas, one data stream, and 3 bit code book that are indicated in the IEEE 802.16 Standard.

The transmission signal determination module 230 multiplies the transmission weight for each group The IFFTs 242, 244 and 246 convert multiplexing signals from the transmission signal determination module 230 into signals of a timing axis by using a Fourier transform, and the P/Ss 252, 254 and 256 convert the IFFT signals into serial signals and P/S 252, 254 and 256 also add a CP. Such signals including a CP are transmitted to each antenna through the D/A converter and filters 262, 264 and 266.

However, when the transmission weight of the transmission antenna is obtained by using the channel used in the MIMO precoding scheme or when the code book is used for reducing the feedback, the weight for each subcarrier is normalized to one. In more detail, as shown in FIG. 3, the weight for each subcarrier can be represented by the following Equation (3):

$$|v1|^2+|v2|^2+|v3|^2+|v4|^2=1 \quad (3)$$

where vi denotes $i^{th}$ vector index of the weight for each subcarrier.

However, when delay spread exists in the OFDM system, the channel between groups may be changed.

FIG. 4 is a graph illustrating a conventional sum of antenna channel power for each group when consecutive G groups are allocated to a terminal.

As shown in FIG. 4, the sums of antenna channel power for each group are different for each group. However, since the conventional art does not use such difference of the channel power between groups, optimal transmission performance for can not be expected.

Therefore, the transmission weight for each antenna needs to be determined in considering channel condition of each group of the OFDM system in order to improve transmission efficiency.

SUMMARY OF THE INVENTION

The present invention provides a method for allocating transmission power for improving transmission efficiency in considering channel changes between groups to which the transmission weight for each antenna is allocated.

According to the present invention, a first method for allocating transmission power in a communication system including multiple antennas is provided. A plurality of subcarriers are grouped by a plurality of groups, and each group includes at least one subcarrier. The method includes calculating a transmission power weight for each group by using channel information, calculating an antenna transmission vector for each group by using the channel information, calculating a transmission power for each group of each antenna by using the transmission power weight for each group and the antenna transmission vector for each group, determining transmission signals to be transmitted from the multiple antennas by using the transmission power, and transmitting the transmission signals through the multiple antennas.

According to the present invention, a second method for allocating transmission power in a communication system including multiple antennas is provided. A plurality of subcarriers are grouped by a plurality of groups, and each group includes at least one subcarrier. The method includes receiving a code book index and a power weight from a receiver, calculating a transmission power weight for each group from the power weight, calculating an antenna transmission vector for each group from the code book index, calculating a transmission power for each group of each antenna by using the transmission power weight for each group and the antenna transmission vector for each group, determining transmission signals to be transmitted from the multiple antennas by using the transmission power, and transmitting the transmission signals through the multiple antennas.

According to the present invention, a first apparatus for allocating transmission power in a communication system including multiple antennas is provided. A plurality of subcarriers are grouped by a plurality of groups, and each group includes at least one subcarrier. The apparatus includes a channel information module for storing channel information for each group, a transmission power weight module for calculating a transmission power weight for each group by using the channel information, an antenna transmission vector determination module for calculating an antenna transmission vector for each group by using the channel information, a power allocation module for calculating transmission power by using the transmission power weight for each group and the antenna transmission vector for each group, and a transmission signal determination module for determining transmission signals to be transmitted through the multiple antennas by using the transmission power.

According to the present invention, a second apparatus for allocating transmission power is provided. The apparatus includes a transmission power control module for calculating a transmission power weight for each group from a power weight, an antenna transmission vector determination module for calculating an antenna transmission vector for each group from a code book index, a power allocation module for calculating transmission power for each group of each antenna by using the transmission power weight for each group and the antenna transmission vector for each group, and a transmission signal determination module for determining transmission signals to be transmitted through the multiple antennas by using the transmission power.

BRIEF DESCRIPTION OF THE DRAWINGS

The above and other objects, features and advantages of the present invention will become more apparent from the following detailed description when taken in conjunction with the accompanying drawings in which:

FIG. 3 is a table illustrating a conventional transmission signal for each antenna according to a code book index;

DETAILED DESCRIPTION OF THE PREFERRED EMBODIMENTS

Figure 1:
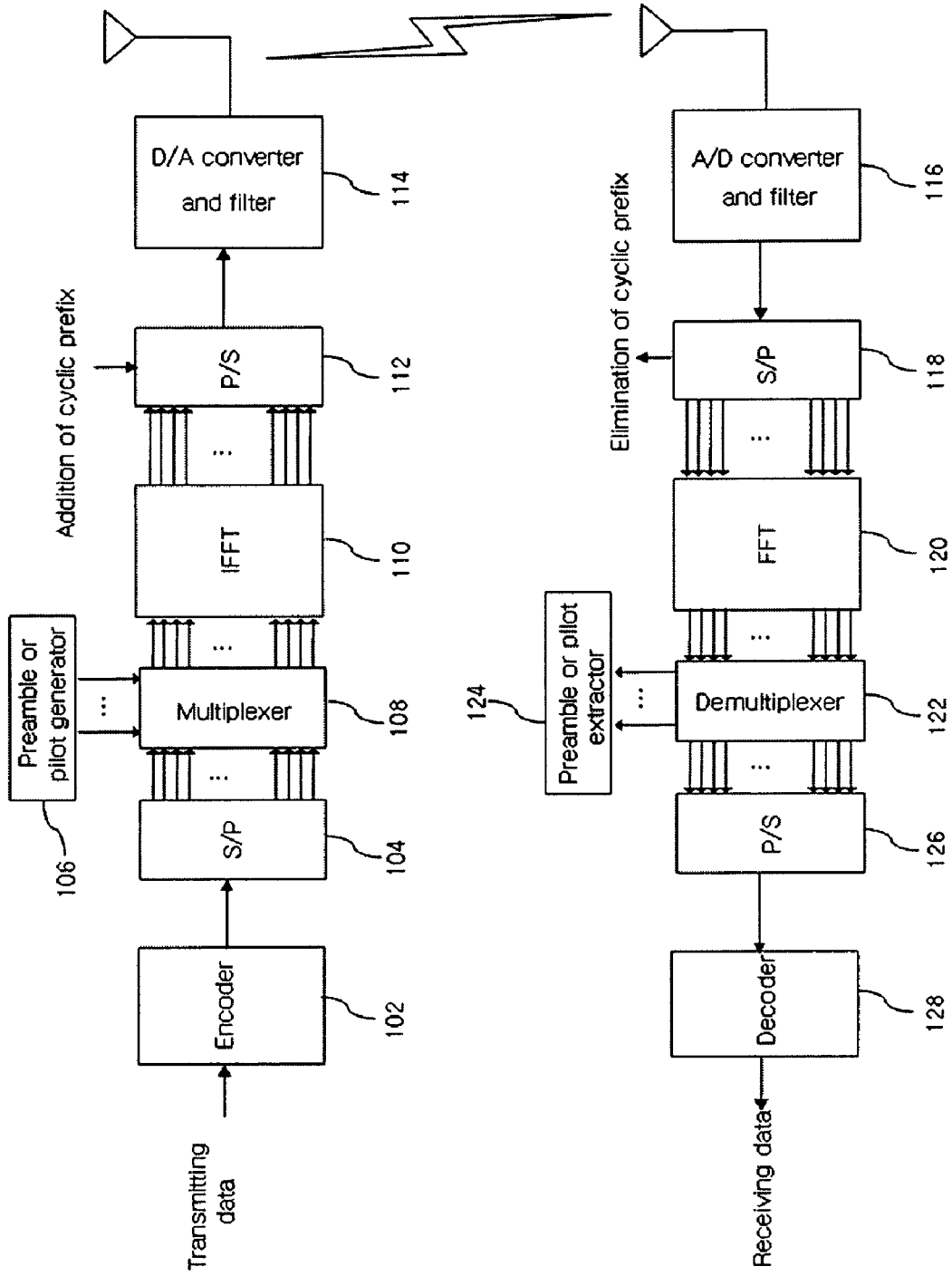
FIG. 1 is a diagram illustrating a conventional data transmission/receiving system employing an OFDM system.

Preferred embodiments of the present invention will hereinafter be described in detail with reference to the accompanying drawings. Like reference numerals designate like elements throughout the specification. In the following description, well-known functions or constructions are not described in detail for the sake of clarity and conciseness.

Throughout this description, the word "module" denotes one single unit performing specific function or operation, and the module can be embodied by hardware and/or software.

Methods for calculating transmission power weight for each group according to preferred embodiments of the present invention may be classified into two methods, namely, a method for using channel information and a method for using a code book. In addition, when transmission power for each group is limited, other methods rather than the two methods described above may be used for calculating transmission power weight. Furthermore, although an OFDM based communication system is preferred herein, the present invention is not limited thereto, and another communication system may be applied to the present invention.

Figure 2:
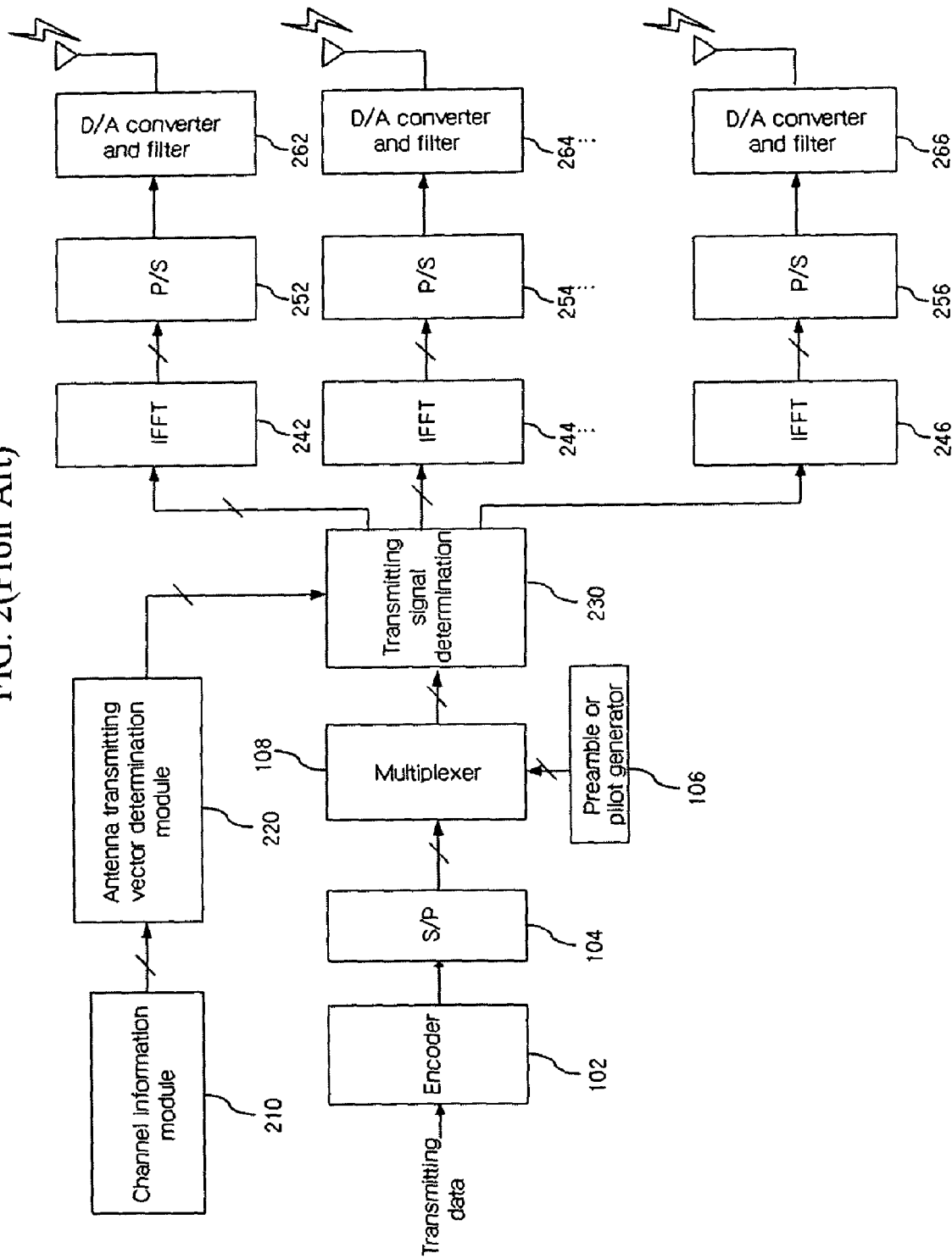
FIG. 2 is a diagram illustrating a conventional transmission block of a multiple antenna applying the MIMO precoding scheme.
Figure 4:
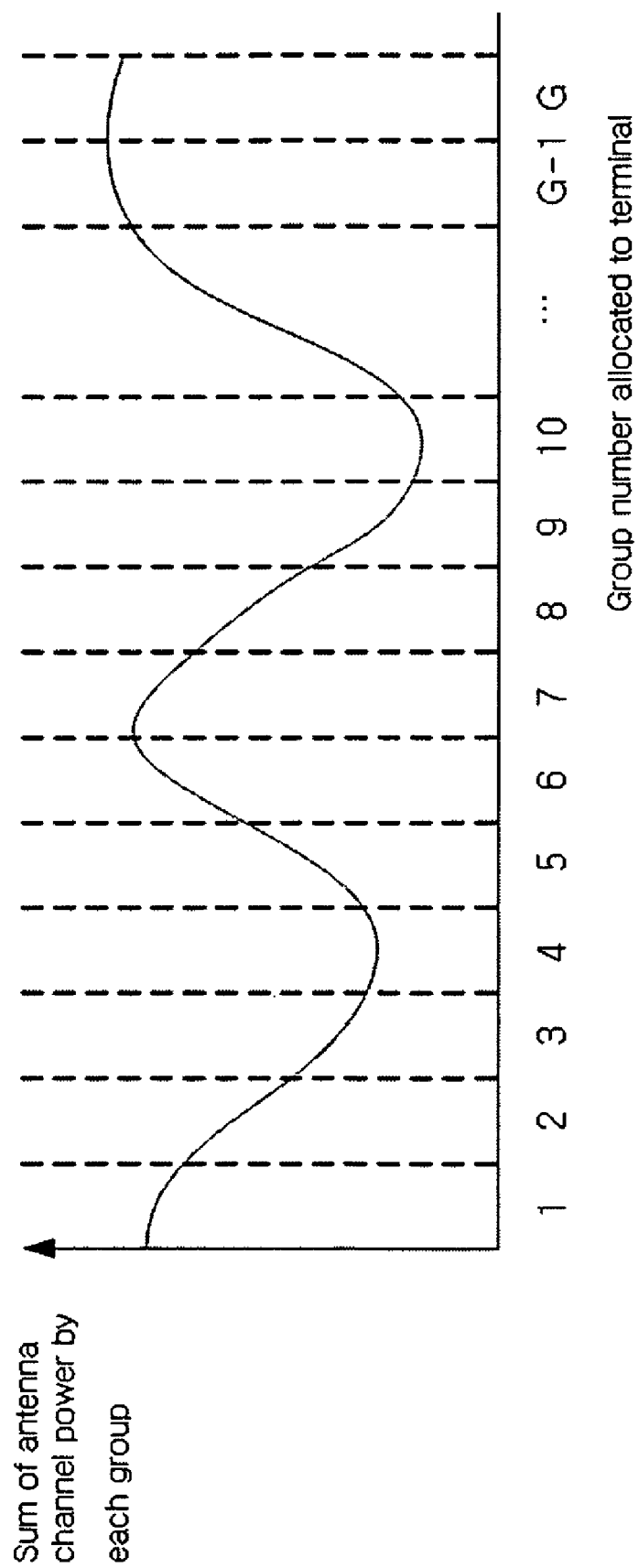
FIG. 4 is a graph illustrating a conventional sum of antenna channel power for each group when consecutive G groups are allocated to a terminal.

A method for calculating transmission power weight for each group by using channel information according to a first embodiment of the present invention will be described with reference to FIG. 2 and FIG. 5. Referring to FIG. 2, in order to explain the method for calculating transmission power weight for each group by using channel information, $q_{g,i,m}$ denoting i-th subcarrier of g-th group and transmission signal of m-th group can be obtained by the following Equation (4):

$$q_{g,i,m} = w_{g,m} s_{g,i} \quad (4)$$

In addition, a received signal of i-th subcarrier of g-th group that is allocated to an OFDM terminal can be obtained by the following Equation (5).

$$r_{g,i} = \sum_{m=1}^{M} h_{g,i,m} w_{g,m} s_{g,i} + n_{g,i} \quad (5)$$

In Equation (5), $r_{g,l}$ denotes a received signal of i-th (i=1, 2, ..., l) subcarrier of g-th (g=1, 2, ..., G) group, and Gl denotes the number of subcarriers allocated to a terminal. The $h_{g,i,m}$ denotes a channel for a m-th transmission antenna of i-th subcarrier of g-th group, $w_{g,m}$ denotes a transmission weight vector for a m-th transmission antenna of g-th group, and when the number of the transmission antenna is M, and the number of the receiving antenna is 1, the transmission antenna vector maximizing SNR can be represented by the following Equation (6):

$$w_g = h^*_g / |h_g| \quad (6)$$

wherein $$h_g^T = [h_{g,1} h_{g,2} \ldots h_{g,M}], \quad h_{g,m} = \frac{1}{I}\sum_{i=1}^{I} h_{g,i,m},$$

$S_{g,l}$ denotes a modulated transmission symbol of i-th subcarrier of g-th group, and $n_{g,l}$ denotes interference and noise factor of i-th subcarrier of g-th group.

When the channel information is obtained by using channel reversibility or by direct feedback, and the number of groups allocated to a terminal is G, normalized power is represented by the following Equation (7).

$$p = \frac{1}{G}\sum_{g=1}^{G} \|h_g\|^2, \quad \text{here,} \quad \|h_g\|^2 = \sum_{m=1}^{M} |h_{g,m}^2| \quad (7)$$

Here, the number of the transmission antenna is M, and the number of the receiving antenna is 1. However, Equation (7) can also be applied to the case in which the number of the receiving antennas is R. When R receiving antennas are used, other values rather than the sum of channel power for each antenna can be used for calculating transmission weight. For example, the eigenvalue obtained from eigenvalue decomposition can be used for calculating transmission weight. At this time, $\lambda_g$ instead of $\|h_g\|^2$ can be used for calculating transmission weight, wherein $\lambda_g$ is maximum eigenvalue of g-th group.

The normalized transmission power weight ($\alpha_g$) that is allocated to the g-th group can be obtained by the following Equation (8).

$$\alpha_g = \frac{\|h_g\|^2}{P} \quad (8)$$

Figure 5:
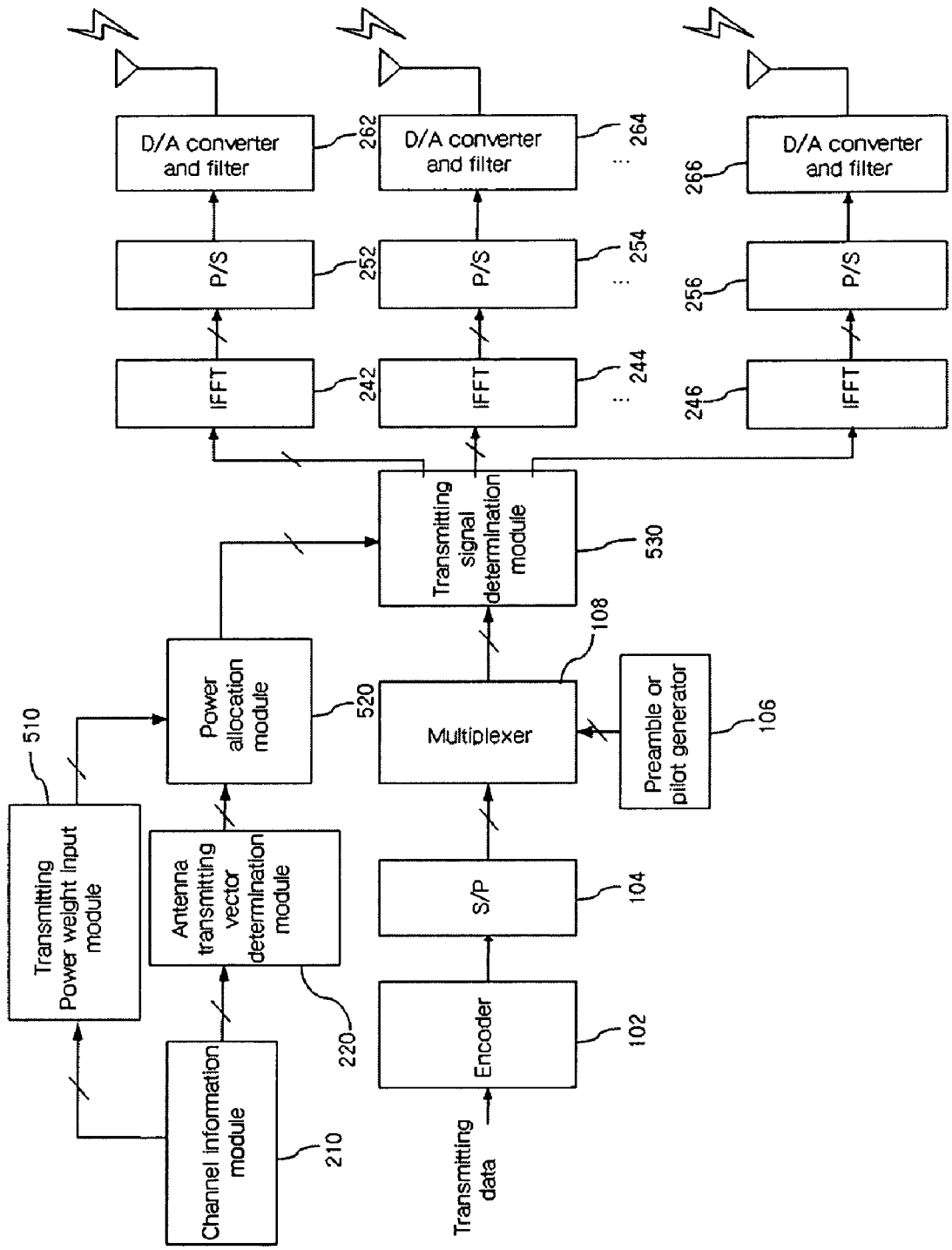
FIG. 5 is a diagram illustrating a transmission block according to a first embodiment of the present invention.

FIG. 5 illustrates a transmission block using the transmission power weight calculated by Equation (8). In FIG. 5, the transmission block uses a transmission power weight for each group that is calculated from known channel information.

The transmission block according to the first embodiment illustrated in FIG. 5 uses the transmission power weight for each group. The transmission block further includes a transmission power weight input module 510 and a power allocation module 520, compared to the transmission block illustrated in FIG. 2. The structure and function of the transmission signal determination module 530 differ from those of the transmission signal determination module 230 of FIG. 2, as will be discussed.

The transmission power weight input module 510 inputs the transmission power weight ($\alpha_g$) calculated by Equation (8), and the power allocation module 520 allocates transmission power by using the transmission power weight ($\alpha_g$) received from the transmission power weight input module 510 and the transmission weight ($w_{g,m}$) for m-th transmission antenna of g-th group, wherein the $w_{g,m}$ is received from the antenna transmission vector determination module 220. Here, the allocated power can be represented by $\sqrt{\alpha_g} w_{g,m}$.

By using the transmission power received from the power allocation module 520, the transmission signal determination module 530 determines the transmission signal that needs to be allocated to each antenna. The transmission signal $q_{g,i,m}$ for the m-th antenna of the i-th subcarrier of the g-th group can be represented by the following Equation (9):

$$q_{g,i,m} = \sqrt{\alpha_g} w_{g,m} s_{g,i} \quad (9)$$

wherein the $q_{g,i,m}$ is determined by the transmission signal determination module 530.

A received signal ($r_{g,i}$) of the i-th subcarrier of the g-th group can be obtained by the following Equation (10), wherein $r_{g,i}$ is received from the transmission block, and the transmission block uses the transmission power weight for each group.

$$r_{g,i} = \sqrt{\alpha_g} \sum_{m=1}^{M} h_{g,i,m} w_{g,m} s_{g,i} + n_{g,i} \quad (10)$$

Figure 6:
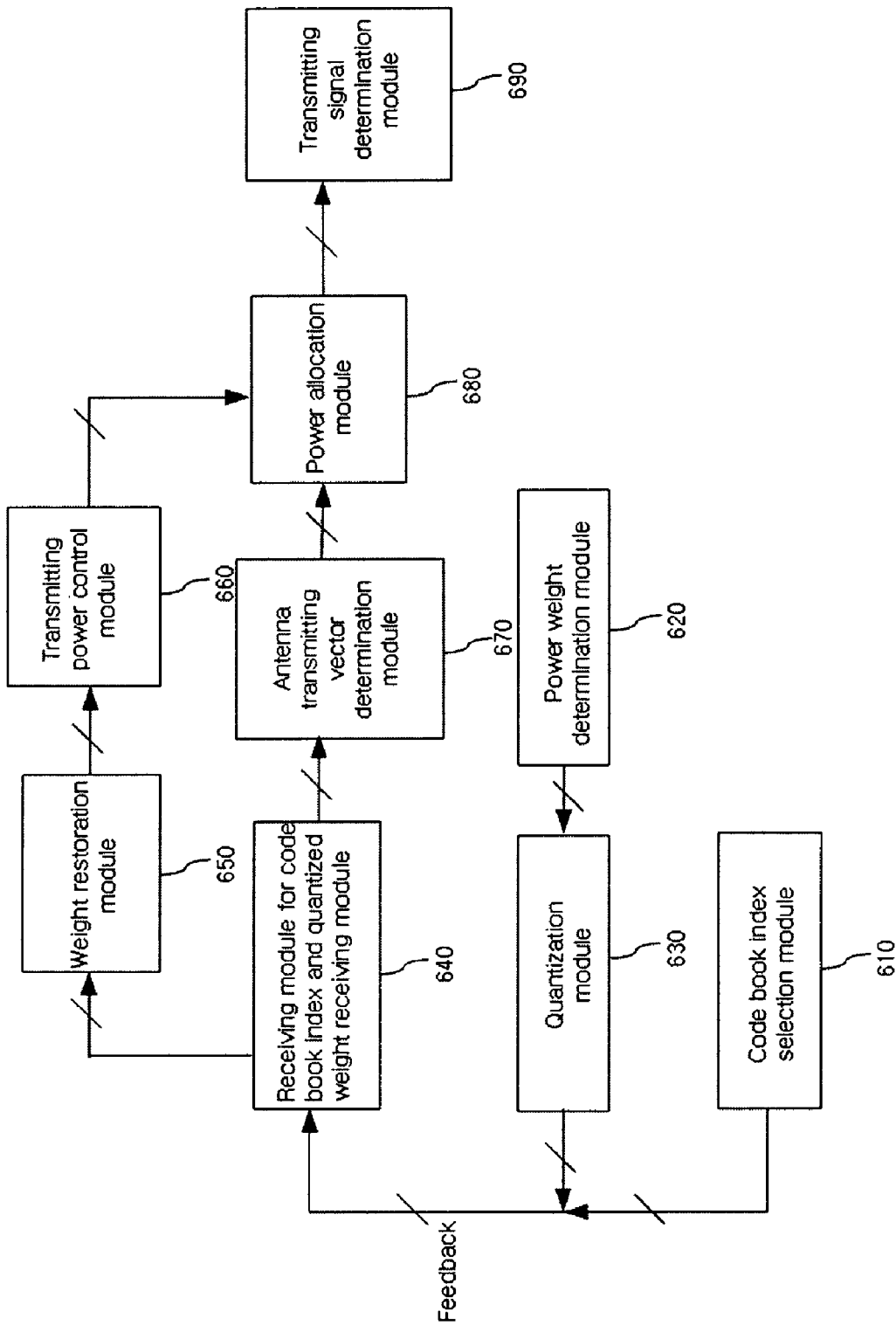
FIG. 6 is a diagram illustrating a transmission block according to a second embodiment of the present invention.

FIG. 6 is a diagram illustrating a transmission block according to a second embodiment of the present invention.

When the code book is used for calculating the transmission power weight for each group, it is assumed that J bit is used for the transmission weight $w_{g,m}$ for each antenna of each group. For example, the J bit denotes 3 bit in FIG. 3. In addition, K bit is additionally used so as to feedback the transmission power weight that is allocated to each group.

When $P_{max}$ denotes power of a group that has maximum power value $$\left( \sum_{m=1}^{M} |h_{g,m}|^2 \right)$$

among G groups allocated to the terminal, the weight for each group can be obtained by the normalization to $P_{max}$. Here, the normalized weight ($\delta_g$) for each group is represented by the following Equation (11), $$\delta_g = \frac{\|h_g\|^2}{P_{max}} \quad (11)$$

wherein $\delta_g$ denotes amounts from 0 to 1.

When the $\delta_g$ is quantized to K bit, the feedback for the $\delta_g$ can be performed by dividing amounts from 0 to 1 into $2^K$ units. In addition, the intervals between units can be classified into a fixed interval or variable interval according to a predetermined rule between a transmitter and a receiver.

A terminal or base station receiving the feedback calculates Power (P) of all groups by using index received by the feedback, wherein all groups are allocated to the terminal or base station. Here, Power P can be obtained by the following Equation (12):

$$P = \frac{1}{G} \sum_{g=1}^{G} \hat{\delta}_g \quad (12)$$

Here, $\hat{\delta}_g$ denotes power after the feedback information of K bit received from the g-th group is substituted by the rule between the transmitter and receiver from 0 to 1. In addition, power $\alpha_g$ allocated to each group can be calculated by the following Equation (13):

$$\alpha_g = \frac{\hat{\delta}_g}{P} \quad (13)$$

FIG. 6 is a diagram illustrating a transmission block according to the second embodiment of the present invention, wherein the transmission block uses a transmission power weight for each group that is calculated by using a code book.

The transmission block includes a code book index selection module 610, power weight determination module 620, quantization module 630, code book index and quantized weight receiving module 640, weight restoration module 650, transmission power control module 660, antenna transmission vector determination module 670, power allocation module 680 and transmission signal determination module 690.

The code book index selection module 610 selects a code book index showing optimal performance, namely a code book index of J bit. The power weight determination module 620 calculates the normalized weight $\delta_g$ for the power of the group having the maximum power. The quantization module 630 quantizes for the normalized power weight $\delta_g$ by using K bit.

The code book index and quantized weight receiving module 640 receives the code book index and the quantized power weight from the code book index selection module 610 and the quantization module 630, transmits the code book index to the antenna transmission vector determination module 670 and transmits the quantized power weight to the weight restoration module 650.

The weight restoration module 650 restores the quantized weight received by using K bit, and the transmission power control module 660 calculates the transmission weight for each group $\alpha_g$ from the restored power weight and transmits $\alpha_g$ to the power allocation module 680.

The antenna transmission vector determination module 670 calculates the antenna transmission vector for each group $W_{g,m}$ by using J bit, and transmits $W_{g,m}$ to the power allocation module 680.

The power allocation module 680 allocates transmission power $\sqrt{\alpha_g} w_{g,m}$, by using the transmission power weight ($\alpha_g$) for each group received from the transmission power control module 660 and the transmission weight ($w_{g,m}$) received from the antenna transmission vector determination module 670.

The transmission signal determination module 690 determines transmission signals by using transmission power received from the power allocation module 680, wherein the transmission signals need to be transmitted to the each antenna. Here, the transmission signal for the m-th antenna of i-th subcarrier of g-th group determined by the transmission signal determination module 690 can be obtained by the following Equation (14):

$$q_{g,i,m} = \sqrt{\alpha_g} w_{g,m} s_{g,i} \quad (14)$$

The received signal ($r_{g,i}$) for i-th subcarrier of g-th group can be obtained by Equation (10) as described above, wherein the $r_{g,i}$ is received from a transmission block using transmission power weight for each group that is calculated by using the code book. Therefore, the same transmission signal $q_{g,i,m}$ and received signal $r_{g,i}$ can be obtained by using the transmission power weight for each group from the known channel information or from the code book.

When a plurality of transmission antennas are used, the amplifier having amplification characteristic M times greater than the number of the transmission antenna becomes necessary. Accordingly, hardware cost increases. However, according to a third embodiment of the present invention to be described with reference to FIG. 7, the transmission power weight is allocated by limiting the maximum transmission power for each antenna in order to reduce hardware cost. When the maximum transmission power ratio is $\beta$ ($0<\beta\leq 1$), $\beta$ can be determined by the hardware realization. When the number of the transmission antenna is M, and the transmission power is limited as in the method not using channel information, $\beta$ equals $1/M$.

Therefore, the transmission power $P_m$ normalized to the group G entirely using m-th antenna can be obtained by the following Equation (15).

$$P_m = \frac{1}{G}\sum_{g=1}^{G}(\alpha_g |h_{g,m}|^2) \qquad (15)$$

When the normalized maximum transmission power ratio for each antenna is limited to β, the transmission power weight for each antenna can be determined according to $P_m$ and β.

In case of $P_m \leq \beta$ in all M transmission antennas, the transmission power weight for each antenna can be transmitted by directly applying the antenna weight $\sqrt{\alpha_g}w_{g,m}$, calculated from the power allocation modules 520 and 680.

When the antenna having $P_m > \beta$ is one or more, the transmission power for each additional antenna needs to be controlled. The antenna weight $\sqrt{\beta\alpha_g}w_{g,m}$ is transmitted to the antenna having $P_m > \beta$.

In addition, $\eta_m$ having 1−β needs to be calculated. Here, $\eta_m$ denotes the power weight greater than β in the m-th antenna having limited transmission power, and when $P_m \leq \beta$, $\eta_m = 0$. The $\eta_m$ additionally allocates to the n1 antenna having the greatest amount of transmission power among the antennas satisfying the condition of $P_m \leq \beta$, wherein n1 is the amount between 1 and M, and n1 does not equal to m. In addition, when the additionally allocated power weight satisfies the condition of $(P_{n1} + \eta_m) > \beta$, the antenna is limited to the power weight of β, and the $\eta_{n1}$ is calculated by the following Equation (16):

$$\eta_{n1} = (P_{n1} + \eta_m) - \eta \qquad (16)$$

The transmission power weight for each antenna can be determined by the steps as described above.

For example, when β=0.35, and 4 transmission antennas exist, and the transmission power weights for each normalized antenna are $P_1$=0.30, $P_2$=0.50, $P_3$=0.15, $P_4$=0.05, the transmission power weight of the second antenna can be denoted by $\gamma_2$=β=0.35, and $\eta_1$=0, $\eta_2$=0.15, $\eta_3$=0, $\eta_4$=0 because the transmission power weight of the second antenna is greater than β. The first antenna has the greatest normalized power weight satisfying the condition of $P_m \leq \beta$, and the transmission power weight of the first antenna is greater than β because $P_1 + \eta_2$=0.45. Accordingly, the transmission power weight of the first antenna is $\gamma_1$=β=0.35, and it is renewed to $\eta_1 = P_1 + \eta_2 - 0.35 = 0.1$ when $\eta_1$=0. The third antenna has the second largest transmission power weight, namely $\gamma_3 = P_3 + \eta_1 = 0.25$, and the transmission power weight of the third antenna is smaller than β. Accordingly, the final normalized transmission power for each antenna is $\gamma_1$=0.35, $\gamma_2$=0.35, $\gamma_3$=0.25, $\gamma_4$=0.05.

However, the transmission power remaining in the antennas satisfying $P_m \leq \beta$ can be allocated. Accordingly, $\eta_2$=0.15 is equally allocated to three antennas, and the transmission power weight for each antenna is $\gamma_1$=0.35, $\gamma_2$=0.35, $\gamma_3$=0.20, $\gamma_4$=0.10.

Figure 7:
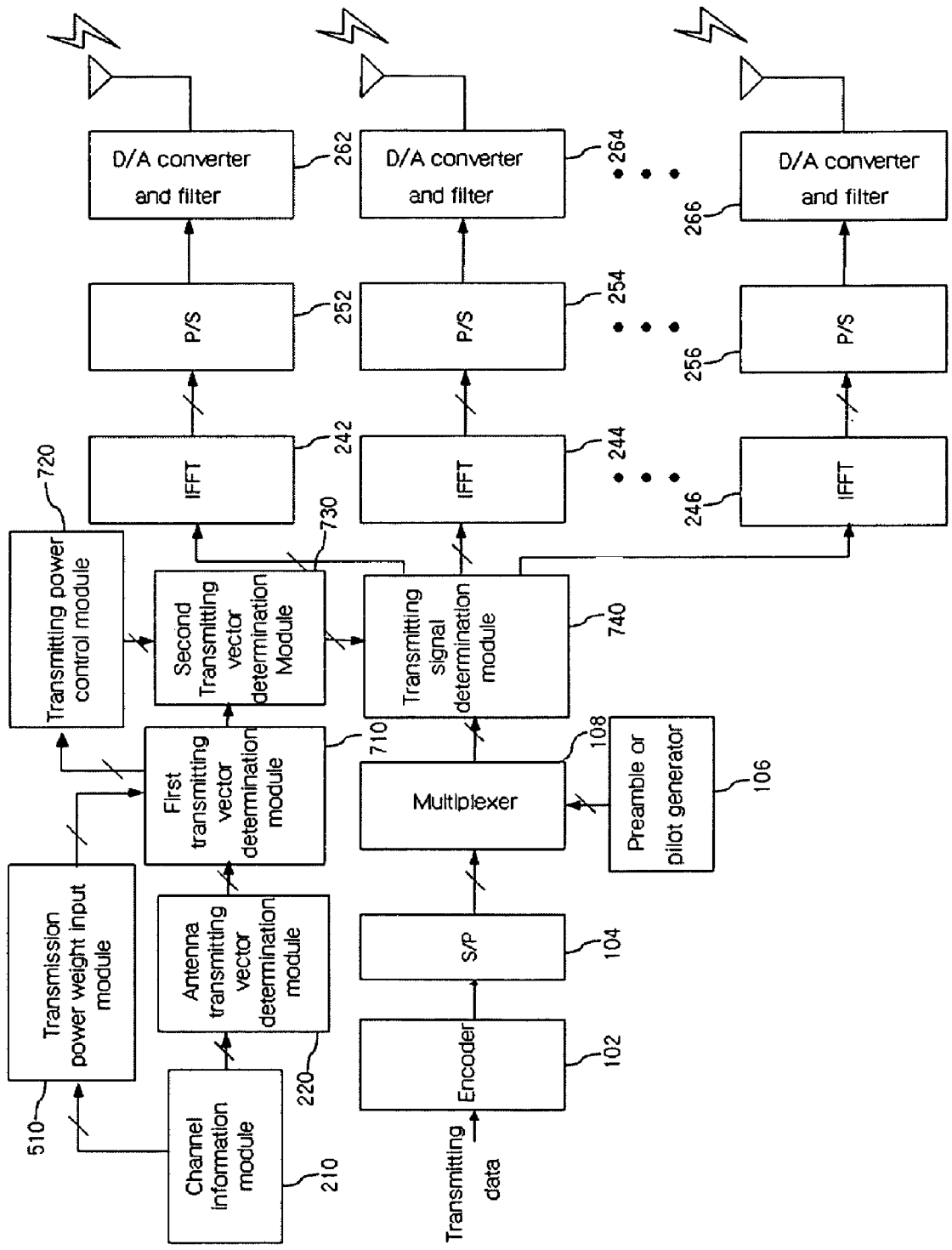
FIG. 7 is a diagram illustrating a transmission block according to a third embodiment of the present invention.

FIG. 7 is a diagram illustrating a transmission block applying a transmission power weight according to the third embodiment of the present invention when a transmission power for each antenna is limited.

When the channel information is already known as described with reference to FIG. 5 and the transmission power in each antenna is limited in a transmission block using the transmission power weight for each group, the transmission block according to the third embodiment includes a first transmission vector determination module 710, transmission power control module 720, and second transmission vector determination module 730 rather than the power allocation module 520 in order to apply the transmission power weight for each antenna.

The first transmission vector determination module 710 determines the first transmission vector by using the transmission power weight ($\alpha_g$) received from the transmission power weight input module 510 and by using the transmission weight ($w_{g,m}$) received from the antenna transmission vector determination module. The first transmission vector equals $\sqrt{\alpha_g}w_{g,m}$. The first transmission vector equals the transmission power value from the power allocation module 520 in FIG. 5.

The transmission power control module 720 calculates the transmission power weight for each antenna $\gamma_m$ by using the method as described above.

The second transmission vector determination module 730 determines the second transmission vector by using the transmission power weight for each antenna received from the transmission power control module 720 and the first transmission vector received from the first transmission vector determination module 710. The second transmission vector determined by the second transmission vector determination module 730 equals $\sqrt{\gamma_m \alpha_g}w_{g,m}$, and the second transmission vector denotes the transmission power allocated to each antenna.

Therefore, the transmission signal determination module 740 determines the transmission signal by using the transmission power received from the second transmission vector. The transmission signal $q_{g,i,m}$ is determined by the following Equation (17):

$$q_{g,i,m} = \sqrt{\gamma_m \alpha_g}w_{g,m}s_{g,i} \qquad (17)$$

wherein the $q_{g,i,m}$ denotes the transmission signal of the m-th antenna of the i-th subcarrier of the g-th group calculated in the transmission signal determination module 740.

Therefore, when the transmission power for each antenna is limited according to the third embodiment of the present invention, the received signal ($r_{g,i}$) of the i-th subcarrier of the g-th group from the transmission block applying the transmission power weight for each antenna can be represented by the following Equation (18).

$$r_{g,i} = \sqrt{\alpha_g}\sum_{m=1}^{M}\sqrt{\gamma_m}h_{g,i,m}w_{g,m}s_{g,i} + n_{g,i} \qquad (18)$$

Since the transmission weight for each antenna is determined by considering channel changes for each group in the transmission system including a plurality of antennas, and the signal including the transmission weight is transmitted, the transmissions efficiency can be improved.

The foregoing methods and apparatuses are not only realized by the preferred embodiments of the present invention, but, on the contrary, are intended to be realized by a program for executing functions corresponding to the preferred embodiments or a recording medium for recording the program.

As those skilled in the art would realize, the described embodiments may be modified in various different manners, without departing from the spirit or scope of the present invention. Accordingly, the foregoing drawings and description are to be regarded as illustrative in nature and not restrictive.

While this invention has been described in connection with what is presently considered to be preferred embodiments, it is to be understood that the invention is not limited thereto, but, on the contrary, is intended to cover various modifications and equivalent arrangements included within the spirit and scope of the appended claims.

What is claimed is:

1. A method for allocating transmission power in a communication system including multiple antennas including a plurality of subcarriers grouped by a plurality of groups, each group including at least one subcarrier, the method comprising:
calculating a first transmission power weight for each group by using channel information;
calculating an antenna transmission vector for each group by using the channel information;
calculating a transmission power for each group of each antenna by using the first transmission power weight and the antenna transmission vector for each group;
determining transmission signals to be transmitted from the multiple antennas by using the transmission power; and
transmitting the transmission signals through the multiple antennas;
wherein, when transmittable power for each antenna is low, the calculating the transmission power comprises:
calculating a first transmission vector by using the first transmission power weight and the antenna transmission vector for each group;
calculating a second transmission power weight for each antenna for allocating the transmission power by using the first transmission power weight for each group and the transmittable power for each antenna; and
calculating a second transmission vector used for the transmission power by using the first transmission vector and the first transmission power weight of each antenna.

2. The method of claim 1, wherein the transmission power weight for each group is calculated by using normalized power calculated from the channel information.

3. The method of claim 1, wherein the first transmission vector is calculated by multiplying the antenna transmission vector for each group by a square root of the first transmission power weight for each group.

4. The method of claim 1, wherein the second transmission power weight for each antenna is calculated by comparing the first transmission power weight for each antenna with a maximum transmission power ratio.

5. The method of claim 4, wherein, the second transmission power weight for each antenna is set as the first transmission power weight for each antenna when the first transmission power weight for each of the multiple antennas is less than the maximum transmission power ratio.

6. The method of claim 4, wherein the second transmission power weight for at least one first antenna is determined by the first transmission power ratio and the maximum transmission power ratio, when the first transmission power weight for at least one first antenna of the multiple antennas is greater than the maximum transmission power ratio, and
a difference between the maximum transmission power ratio and the transmission power weight for each antenna is allocated as the transmission power weight for at least a second antenna of the multiple antennas.

7. The method of claim 1, wherein the second transmission vector is calculated by multiplying the first transmission vector by a square root of the second transmission power weight for each antenna.

8. The method for allocating transmission power of claim 1, wherein the transmission power weight for each group is calculated by checking the channel information with the use of channel reversibility or by directly using the channel information.

9. The method of claim 1, wherein the antenna transmission vector for each group is calculated by performing eigenvalue decomposition for an optimal transmission weight vector calculated from the channel information so as to maximize the Signal-to-Noise Ratio (SNR) for each antenna.

10. The method of claim 1, wherein the transmission power is calculated by multiplying the antenna transmission vector for each group by a square root of the first transmission power weight for each group.

11. The method of claim 1, wherein the transmission signals are determined by multiplying the transmission power by signals multiplexed by the transmission data.

12. A method for allocating transmission power in a communication system including multiple antennas, including a plurality of subcarriers grouped by a plurality of groups, and each group includes at least one subcarrier, the method comprising: receiving a code book index and a power weight from a receiver;
calculating a first transmission power weight for each group from the power weight, calculating an antenna transmission vector for each group from the code book index;
calculating a transmission power for each group of each antenna by using the first transmission power weight and the antenna transmission vector for each group; determining transmission signals to be transmitted from the multiple antennas by using the transmission power; and transmitting the transmission signals through the multiple antennas;
wherein, when transmittable power for each antenna is limited, calculating the transmission power comprises:
calculating a first transmission vector by using the first transmission power weight and the antenna transmission vector for each group;
calculating a second transmission power weight for each antenna for allocating the transmission power by using the first transmission power weight for each group and the transmittable power for each antenna; and
calculating a second transmission vector used for the transmission power by using the first transmission vector and the second transmission power weight for each antenna.

13. The method of claim 12, wherein the code book index is an optimal transmission vector calculated by the receiver from a code book determined between a transmitter and the receiver.

14. The method of claim 12, wherein the power weight is calculated by quantizing a normalized weight for power of a data group having maximum power.

15. The method of claim 14, wherein the normalized weight is calculated by dividing power of groups allocated in the receiver for receiving the transmission signal by the power of the data group having the maximum power.

16. The method of claim 15, wherein the normalized weight is between 0 and 1.

17. The method of claim 12, wherein the transmission power is calculated by multiplying the antenna transmission vector for each group by a square root of the first transmission power weight for each group.

18. The method of claim 12, wherein the transmission signals are determined by multiplying the transmission power by signals multiplexed by transmission data.

19. An apparatus for allocating transmission power in a communication system including multiple antennas, wherein a plurality of subcarriers are grouped by a plurality of groups, each group including at least one subcarrier, the apparatus comprising:
a channel information module for storing channel information for each group;
a transmission power weight module for calculating a first transmission power weight for each group by using the channel information;
an antenna transmission vector determination module for calculating an antenna transmission vector for each group by using the channel information;
a power allocation module for calculating a transmission power for each group of each antenna by using the first transmission power weight and the antenna transmission vector for each group; and
a transmission signal determination module for determining transmission signals to be transmitted through the multiple antennas by using the transmission power;
wherein, when a transmittable power for each antenna is low, the power allocation module comprises:
a first transmission vector determination module for calculating a first transmission vector by using the first transmission power weight and the antenna transmission vector for each group;
a transmission power control module for each antenna for calculating a second transmission power weight for each antenna for allocating the transmission power by using the first transmission power weight for each group and the transmittable power for each antenna; and
a second transmission vector determination module for calculating the second transmission vector used for the transmission power by using the first transmission vector and the transmission power weight for each antenna.

20. An apparatus for allocating for transmission power in a communication system including multiple antennas, including a plurality of subcarriers grouped by a plurality of groups, each group including at least one subcarrier, the apparatus comprising:
a transmission power control module for calculating, from a power weight, a first transmission power weight for each group;
an antenna transmission vector determination module for calculating, from a code book index, an antenna transmission vector for each group;
a power allocation module for calculating a transmission power for each group of each antenna by using the first transmission power weight and the antenna transmission vector for each group; and
a transmission signal determination module for determining transmission signals to be transmitted through the multiple antennas by using the transmission power;
wherein, when transmittable power for each antenna is low, the power allocation module comprises:
a first transmission vector determination module for calculating a first transmission vector by using the first transmission power weight and the antenna transmission vector for each group;
a transmission power control module for each antenna for calculating a second transmission power weight for each antenna for allocating the transmission power by using the first transmission power weight for each group and the transmittable power for each antenna; and a second transmission vector determination module for calculating the second transmission vector used for the transmission power by using the first transmission vector and the second transmission power weight for each antenna.

21. The apparatus of claim 20, wherein the code book index is an optimal transmission vector calculated by a receiver from a code book determined between a transmitter and the receiver.

22. The apparatus of claim 20, further comprising:
a code book index and quantized weight receiving module for receiving a quantized power weight and the code book index from a receiver; and
a weight restoration module for restoring the quantized power weight, wherein the power weight used for the transmission power control module is a power weight restored by the weight restoration module.

* * * * *